US007170630B2

(12) United States Patent
Kataoka

(10) Patent No.: US 7,170,630 B2
(45) Date of Patent: Jan. 30, 2007

(54) COMMUNICATION TERMINAL DEVICE

(75) Inventor: Naoto Kataoka, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 963 days.

(21) Appl. No.: 09/991,308

(22) Filed: Nov. 13, 2001

(65) Prior Publication Data

US 2002/0060876 A1 May 23, 2002

(30) Foreign Application Priority Data

Nov. 21, 2000 (JP) ............................. 2000-354996

(51) Int. Cl.
G06K 15/00 (2006.01)
G06F 3/12 (2006.01)
(52) U.S. Cl. .................................... 358/1.16; 358/1.13
(58) Field of Classification Search ................ 358/1.2, 358/1.17, 505, 1.18, 468, 404, 1.16, 1.13, 358/1.15, 1.1, 1.5, 1.6, 1.9, 1.11, 1.12, 1.14, 358/444; 355/23, 24, 25
See application file for complete search history.

(56) References Cited

U.S. PATENT DOCUMENTS 5,519,484 A * 5/1996 Kumagai ..................... 399/364
5,568,573 A * 10/1996 Wada et al. ................. 382/317
5,724,490 A * 3/1998 Shibaki et al. .............. 358/1.15
5,918,088 A * 6/1999 Rikima ......................... 399/82
5,920,686 A * 7/1999 Mitani ........................ 358/1.16
5,920,744 A * 7/1999 Matsubara et al. ........... 399/19
5,954,436 A * 9/1999 Kageyama et al. .......... 400/188
6,041,165 A * 3/2000 Morikawa .................... 358/1.2

FOREIGN PATENT DOCUMENTS

| JP | 04-065259 | | 3/1992 |
| JP | 07-023156 | | 1/1995 |
| JP | 05162008 | * | 1/1995 |
| JP | 08-223326 | | 8/1996 |
| JP | 09352379 | * | 7/1997 |
| JP | 11-177730 | | 7/1999 |
| JP | 2000-013555 | | 1/2000 |

* cited by examiner

Primary Examiner—Dov Popovici
(74) Attorney, Agent, or Firm—Hogan & Hartson LLP

(57) ABSTRACT

A communication terminal device capable of efficiently using an image memory for storing a received image when performing both-side receiving by using both-side receiving function. A main control unit makes an image memory store the received image when performing both-side receiving via a communication unit by a continuous mode. When images of two pages that are in the relationship of a front page and a back page are present in the image memory, the images of the two pages are recorded on both sides of a sheet by a recording unit, and are erased from the image memory.

11 Claims, 7 Drawing Sheets

FIG. 7A
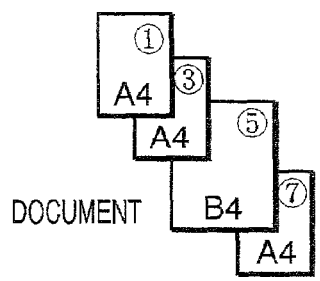
DOCUMENT
FIG. 7B
CONTINUOUS MODE
RECEIVING
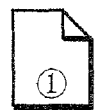 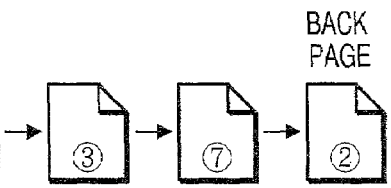 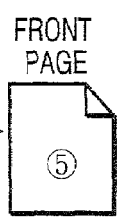 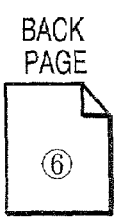
FRONT PAGE ① ③ ⑦  BACK PAGE ② ④ ⑧  COMMUNICATION PROCEDURE FOR CHANGING COMMUNICATION MODE  FRONT PAGE ⑤  BACK PAGE ⑥
○ : PAGE NUMBER
FRONT PAGE
BOTH-SIDE RECORDING   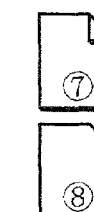 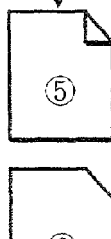
BACK PAGE 
FIG. 7C
ALTERNATE MODE
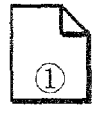 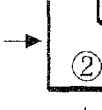 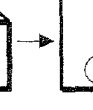 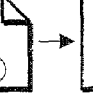 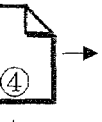 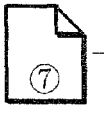 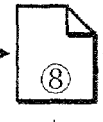 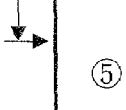
① ② ③ ④ ⑦ ⑧  COMMUNICATION PROCEDURE FOR CHANGING COMMUNICATION MODE  ⑤ ⑥
FRONT PAGE
BOTH-SIDE RECORDING ①  ③  ⑦  
BACK PAGE ②  ④  ⑧  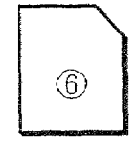
○ : PAGE NUMBER

COMMUNICATION TERMINAL DEVICE

CROSS REFERENCES TO RELATED APPLICATIONS

This application claims priority under 35 USC 119 of Japanese Patent Application No. 2000-354996 filed in JPO on Nov. 21, 2000, the entire disclosure of which is incorporated herein by reference.

BACKGROUND OF THE INVENTION

1. Field of the Invention

The present invention relates to a communication terminal device with both-side receiving function.

2. Description of the Related Art

A communication terminal device capable of carrying out communication by a communication procedure with both-side recording specified has been developed recently. In such a communication terminal device, images which are received by both-side receiving are recorded on both sides of recording paper. For communication modes during both-side communication, there are a continuous mode and an alternate mode. The continuous mode is a mode to continuously carry out transmission of the images that are to be front pages, and to transmit the images that are to be back pages after the completion of the transmission of the images of the front pages. For example, this continuous mode is suitable for the case in which an image reading apparatus of a transmitting side has a mechanism for reading the other of the sides continuously after continuously reading one of the sides of the documents, or for the case in which the recording apparatus of the receiving side has a mechanism for continuously recording images of the front pages on one sides of the paper, and then carrying out the continuous recording of the back pages after stacking and placing the paper again with the paper reversed. On the other hand, the alternate mode is a mode for transmitting the image of the front page and the image of the back page alternately. For example, this alternate mode is suitable for the case in which the image reading apparatus of the transmitting side has a mechanism to read the other side by reversing a document right after reading one side of the document, or in the case in which the recording apparatus of the receiving side has a mechanism for recording an image of a back page on the other side of a sheet of paper by reversing the paper immediately after recording an image of a front page on one side of the sheet. In either mode, the page number can be attached and transmitted in the post command after the transmission of the image of one page.

According to the continuous mode mentioned above, in the receiving side, this mode is preferable for the case in which the recording apparatus has a mechanism to continuously perform recording of one side of the paper, to stack the paper and then to carry out the recording of the back pages by reversing the paper. However, for the recording apparatus which carries out reverse recording of the sheets of paper one by one, the recording cannot be started each time the image of the front page is received. Therefore, it is necessary to store the images of the front pages which are transmitted continuously in the image memory, and to start the recording when the images of the front page and the back page is complete after receiving the back page image. In this case, there are cases in which the page of the back page image starts from the head side, and the page of the back page image starts from the end side. Therefore, there are a case in which the recording cannot be started at the point of time when starting the receiving of the back page image. As a result, conventionally, the recording and outputting is started after the completion of the reception of the images of all pages.

However, in order to keep storing the images in the image memory until the receiving of the images of all pages is completed, an enormous amount of memory is required. Therefore, for example, there were problems in that the storing of the image to be transmitted was obstructed due to the image memory being occupied excessively by the received images.

SUMMARY OF THE INVENTION

With the view of the foregoing, it is an object of the present invention to provide a communication terminal device capable of efficiently using an image memory which stores a received image when carrying out both-side receiving by using both-side receiving function.

According to one aspect of the present invention, there is provided a the communication terminal device with both-side receiving function comprising recording means capable of carrying out both-side recording, an image memory for storing an image, and control means for performing control by the first control mode in which received images are stored in the image memory and the images of the two pages are recorded on both sides of a sheet by the recording means when the images of the two pages that are in relationship of the front page and the back page are received. In this manner, by carrying out recording and outputting when the images of two pages which are in the relationship of the front page and the back page are complete, it becomes possible to erase the recorded and output images from the image memory, and the occupying amount of the image memory by the received image can be decreased.

At this time, when the recording and outputting is started from the image whose corresponding image is present, there is a case in which the user is required to rearrange the recorded and output paper. To prevent this, the control means controls the recording and outputting order, and controls recording such that when the images of two pages that should be recorded next time are stored in the image memory, these images are recorded on both sides of a sheet by recording means.

Moreover, the control means possesses a second control mode in which both-side recording is started after the completion of the reception of the images of all pages, and can perform control so as to selectively carry out either the first control mode or the second control mode. In this manner, it can be selected of either to start the recording after receiving the image of all pages or to start the recording when a front page and a back page become complete.

The selection of the first control mode or the second control mode can be controlled such that the second control mode is selected when the free area available in the image memory is greater than a predetermined amount, or the first control mode is selected when the free area is not greater than the predetermined amount, for example. In this manner, when there is not enough free space in the image memory, recording and outputting can be carried out when a front page and a back page are complete, without accumulating the received images of all pages. Also in this case, recording and outputting can be carried out by taking the order of recording and outputting into consideration.

Additional objects, aspects, benefits and advantages of the present invention will become apparent to those skilled in the art to which the present invention pertains from the

BRIEF DESCRIPTION OF THE DRAWINGS

FIG. 7A is an illustration showing an example of documents in which there is a document having a different size;

FIG. 7B is an illustration showing an example in which images of the documents shown in FIG. 7A are transmitted such that images of the same size documents are transmitted together under the continuous mode; and FIG. 7C is an illustration showing an example in which the images of the documents shown in FIG. 7A are transmitted such that the images of the same size document are transmitted together under an alternate mode.

DETAILED DESCRIPTION OF THE INVENTION

Figure 1:
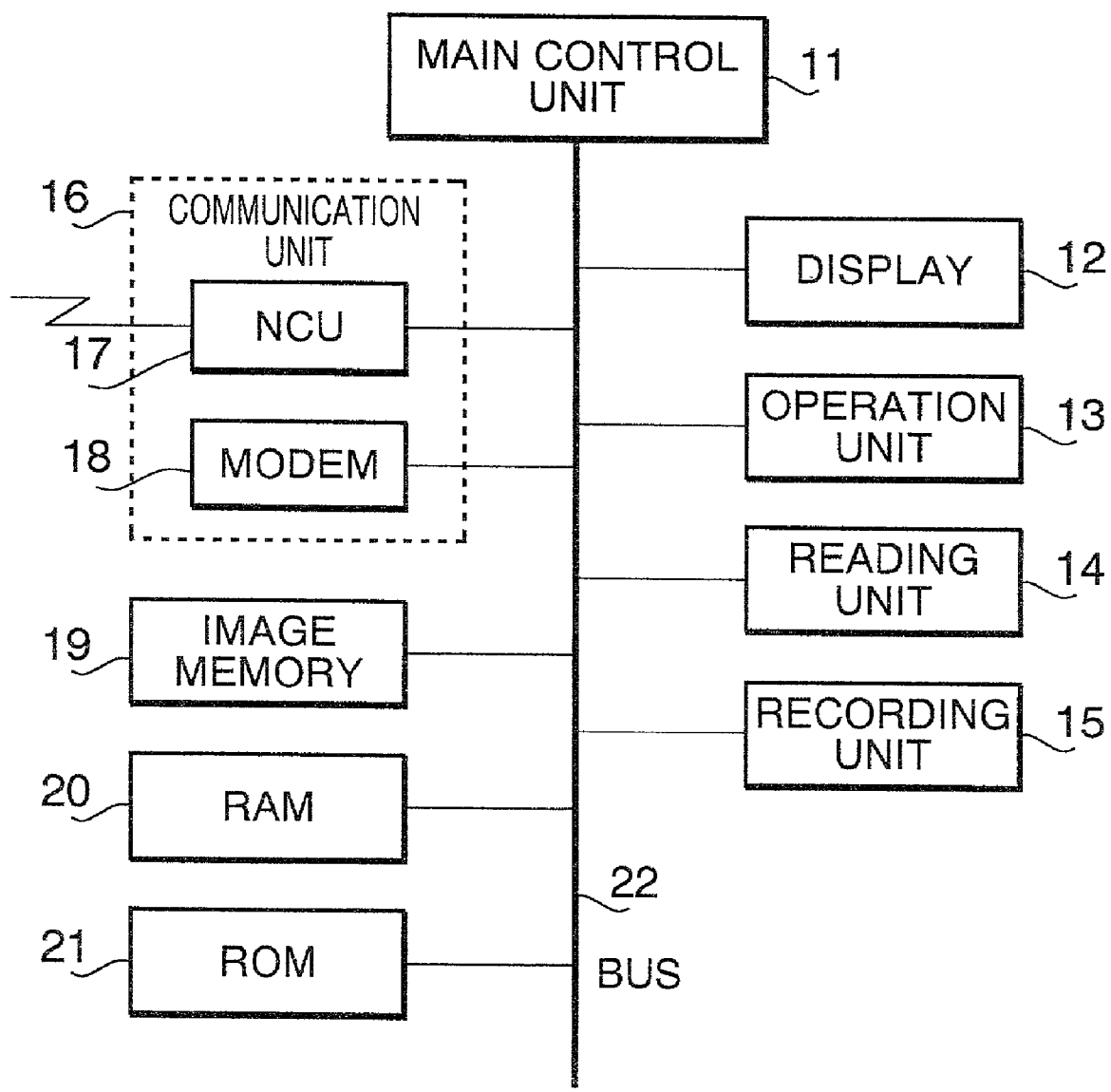
FIG. 1 is a block diagram showing an embodiment of an communication terminal device according to the present invention.

Referring to FIG. 1, the reference numeral 11 designates a main control unit (a control unit), 12 a display, 13 an operation unit, 14 a reading unit, and 15 a recording unit. The reference numeral 16 designates a communication unit which includes an NCU 17 and a modem 18. Further, the reference numeral 19 designates an image memory, 20 a RAM, 21 a ROM, and 22 a bus. These units are connected to one another via the bus 22.

The main control unit 11 controls the entire communication terminal device, and realize image transmitting and receiving function or the like. The main control unit 11 especially possesses both-side transmitting and receiving function, and carries out at least a storing process for storing a received image in the image memory 19 under both-side receiving function, and a recording process for recording images stored in the image memory 19 on both sides of a sheet by the recording unit 15. The recording process can be carried out by selecting either the first control mode or the second control mode. The first control mode performs control such that the recording and outputting can be carried out at the point of time when the images of two pages which are in the relationship of the front page and the back page is completely prepared. At this time, in order to cause the page order of the output paper to be in the predetermined order, control is performed such that recording and outputting is carried out from the images of two pages of the front page and the back page which have reached the order to be recorded and output next time. Moreover, the second control mode performs control so as to start the recording and outputting after receiving the images of all pages. The selecting of the first control mode and the second control mode, for example, can be set by a user from the operation unit 13 in advance. The control can be made such that when the free space available in the image memory 19 is large, the second control mode is selected, and when the available free space is not sufficient, the first control mode is selected.

The display 12 can display various information, such as a message for the user, a message indicating the condition of the device, and operation guidance. The user can carry out various setting or instructions by the operation unit 13. For example, the communication terminal device can be constructed so as to be set for using either the first control mode or the second control mode with one of the modes fixed, or to be set for selecting the modes automatically, during both-side receiving. Furthermore, the communication terminal device can be constructed such that the setting is made so as to arrange the order for the outputting during the first control mode, or so as to ignore the order.

The reading unit 14 follows the control by the main control unit 11, and reads the image on the document which should be transmitted or copied. As for reading methods, various methods can be adopted. It should be noted that the communication terminal device can be constructed without providing this reading unit 14.

The recording unit 15 forms (records) an image received by the communication unit 16, an image read by the reading unit 14, various setting information and management information, messages for the user, or the like on recording paper in accordance with the control from the main control unit 11. As for a recording method, for example, an electrophotographic method, a thermosensitive method, a thermal transfer method, an inkjet method or various methods can be adopted. Here, the recording unit 15 possesses both-side recording function, and can carry out both-side recording sheet by sheet such that after the recording unit records one of the images of two pages that are in relationship of a front page and a back page on one side of a sheet, the recording unit reverses this sheet, and then records the other of the images of this two pages on the other side of this sheet. The present invention is not limited to such recording methods.

The communication unit 16 carries out communication with the machine of the other end via a public switched telephone network (PSTN), a private branch network, or the like. The NCU 17 controls the network or the like. Moreover, the modem 18 carries out modulation and demodulation of the image data to be transmitted or received.

The image memory 19 stores an image to be transmitted, a received image, an image read by the reading unit 14, images during other processes, and the like. When storing an image, the image can be stored without any changes, or can be stored in a compressed state. Concerning the image received by both-side receiving, since the page number is transmitted by a post command after the reception of the image, arrangement is made such that the page number corresponds to the image. According to this page number, specifying of the image transmitted afterwards is carried out with regard to the corresponding image within the image memory 19 which has the relationship of the front page and the back page to the image transmitted afterwards.

The RAM 20 is used when it is necessary to save the data in the process of the main control unit 11 or other units. This RAM 20 may store information such as the page numbers corresponding to the images stored in the image memory 19. The ROM 21 stores a program prescribing the operation of the main control unit 11, fixed data, or the like.

The bus 22 connects the main control unit 11, the display 12, the operation unit 13, the reading unit 14, the recording unit 15, the communication unit 16 (the NCU 17, the modem 18), the image memory 19, the RAM 20, the ROM 21 or the like reciprocally, and allows the data to be forwarded between these units. Apart from these units, various apparatuses, such as an outside storing apparatus, can be connected to the bus 22. Moreover, for example, by connecting an interface to the bus 22, the communication terminal device can be connected to an outside computer or the LAN via the interface.

Next, an example of the operation during both-side receiving according to an embodiment of the communication terminal device of the present invention will be described. As in the manner stated above, the main control unit 11 carries out at least a storing process to store the received image into the image memory 19, and a recording process to carry out both-side recording of the images stored in the image memory 19 by the recording unit 15, during both-side receiving. In the storing process, the images received via the communication unit 16 are stored into the image memory 19 successively, and the page numbers of the images transmitted by the post command are arranged so as to correspond to the images. Moreover, in the recording process, the image to be stored in the image memory 19 in the storing process is monitored by the first control mode, and at the point of time when the images which are to be recorded on the front page and the back page of the paper are stored in the image memory 19, the images of two pages are recorded on both sides of a sheet of paper by the recording unit 15. Moreover, in accordance with the second control mode, after the communication is completed, the image stored in the image memory 19 is recorded on both sides of the paper by the recording unit 15. These recording processes will be described below.

Figure 2:
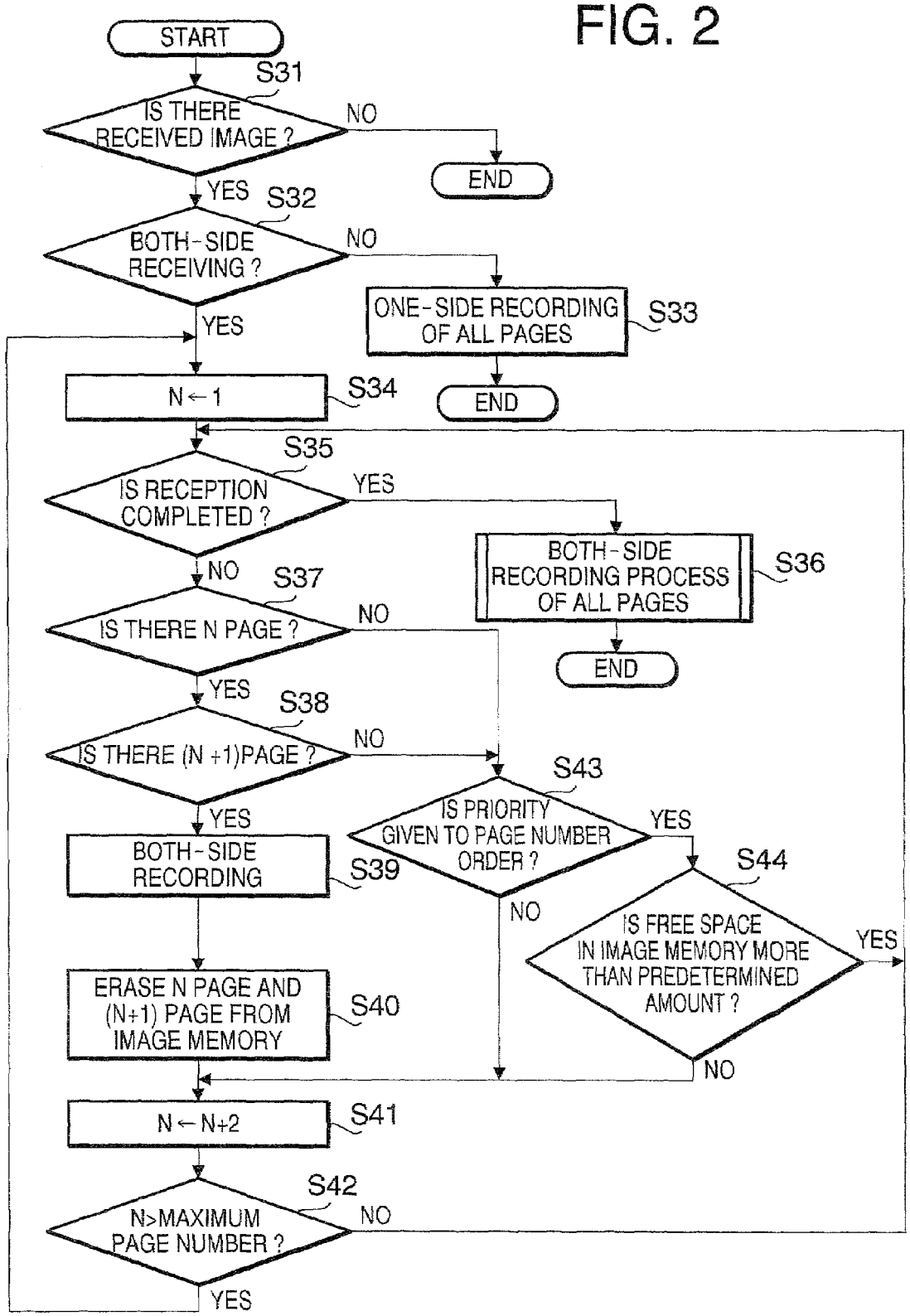
FIG. 2 is a flow chart showing an example of a recording process by a first control mode in the embodiment of the communication terminal device shown in FIG. 1.

One example of the recording process by the first control mode will be described by referring to FIG. 2. In S31, the presence of the received image is confirmed, and then in S32, the communication mode is checked and it is judged which of both-side receiving and one-side receiving has been carried out. When one-side receiving has been carried out, the images of all pages are recorded on one side of paper by the recording unit 15 in S33.

When both-side receiving has been carried out, in S34, the variable N which indicates the page number of the image to be recorded is reset to "1". In S35, it is judged whether or not the receiving has been completed, and when the receiving has been completed, in S36, the images of all pages within the image memory 19 are recorded on both sides of paper by the recording unit 15. This process is a recording process after the completion of receiving, and may be the same as the process of the second control mode. Therefore, for the process of S36, the process of the second control mode, which is to be described below, is carried out.

When receiving is being carried out, in S37, it is judged whether or not the image of the page number N is stored in the image memory 19. When the image of the page number N is stored in the image memory 19, in S38, it is judged whether or not the image of the page number (N+1) which is in the relationship of the front page and the back page with the image of the page number N is stored in the image memory 19. When the images of the page number N and the page number (N+1) are both stored in the image memory 19, both-side recording becomes feasible by using the images of these two pages. Therefore, in S39, the images of these two pages are recorded on both sides of one sheet by the recording unit 15. Then, in S40, the images of the page number N and the page number (N+1) which have been recorded on both sides of the sheet are erased from the image memory 19, and the free space available in the image memory 19 is increased. Accordingly, the occupation by the received image in the image memory 19 can be decreased, and for example, the image memory 19 can be used for storing the image to be transmitted which has been read by the reading unit 14.

In S41, the variable N which indicates the page number of the image to be recoded is increased by the integer "2", and is updated to the page number that is to be recorded on the next recording paper. Then in S42, it is judged whether or not the value of the variable N has exceeded the maximum page number, and when the value of the variable N is within the maximum page number, the process returns to S35. As in the manner stated above, when the images of two pages which are in the relationship of the front page and the back page are stored in the image memory 19, the images are successively recorded on both sides of a sheet by the recording unit 15. Then, when the value of the variable N exceeds the maximum page number, the process returns to S34, the variable N is reset to "1", and when the receiving has been completed, the recording process is completed from S35 through S36.

When the image of the page number N is not stored in the image memory 19 in S37, or when the image of the page number N is stored in the image memory 19 but the image of the page number (N+1) is not stored in the image memory 19 in S38, since the images of two pages which are the front page and the back page are not complete, both-side recording cannot be carried out under such condition. In such a case, in S43, it is judged whether or not setting for performing recording in page number order has been selected. When setting for performing recording in page number order has been selected, the recording is on standby until the image of the page number N is stored in the image memory 19, and the process proceeds to S44. In S44, it is judged whether or not the free space available in the image memory is more than a predetermined amount. When the free space available in the image memory is more than the predetermined amount, the process returns to S35. As in the manner stated, when recording in page number order, until the images of the next pages in page number order (images of the page number N and the page number (N+1)) are stored in the image memory 19, the steps of S35, S37, (S38,) S43, and S44 are carried out repetitively, and the recording is on standby. When the images of the page number N and the page number (N+1) are complete, in S39, both-side recording is carried out, and then these images are erased from the image memory in S40. Then, in S41, the number "2" is added to the variable N so that the next two pages in page number order will be selected, and the process returns to S35 again.

Moreover, when setting for performing recording in page number order has not been selected, the recording and outputting of the page number N and the page number (N+1) are skipped, the process proceeds from S43 to S41 and the variable N is increased by "2", and after confirming that the value of the variable N is within the maximum page number in S42, the process returns to S35, and proceeds to the judgment of the recording and outputting of the next front and back pages. In S37 and S38, by searching for the complete images of two pages that are the front page and the back page successively in this manner, it is possible to carry out both-side recording in S39. Then in S40, the images of two pages which have been recorded on both sides of a sheet are erased from the image memory 19. As in this manner, although there are cases in which the page order of the paper to be discharged is out of order, since the images which can be recorded on both sides of a sheet are first recorded and erased from the image memory 19, the free space available in the image memory 19 can be increased. In such a case, comparing to the case in which the images of all pages are stored in the image memory, only about half of the recording capacity is required. Therefore, for example, in the apparatus whose image memory is small in the capacity, or in the case of storing the image to be transmitted or the like in the image memory 19, it is possible to carry out both-side receiving without interfering with the operation.

Further, when the pages of the front page and the back page are yet to be completed, by skipping, the process proceeds to the judgment of the next set of pages whose the front page and the back page are complete, and the process proceeds to both-side recording. However, when the value of the variable N exceeds the maximum page number in S42, the process returns to S34, and the variable N is reset to "1". Then, the step of searching for the images of the complete front and back pages as in the manner stated above is carried out again. Therefore, both-side recording is carried out according to the order in which both-side recording is carried out from the images of the front page and the back page that have been completed.

In addition, in this example, even in the case in which the setting for performing recording in page number order has been selected, when the free space available in the image memory 19 is becoming less than the predetermined amount, both-side recording is carried out from the images of the complete front and back pages, without complying with the page number order, in order to increase the free space in the image memory 19. Therefore, in S44, it is judged whether or not the free space available in the image memory 19 is more than a predetermined amount, and when it is determined that the free space in the image memory is not more than the predetermined amount, the process proceeds to S41. In this manner, the operation is carried out in the same manner as when the setting for performing recording in page number order has not been selected, and both-side recording is carried out from the images of the complete front and back pages. As a result, the free space available in the image memory 19 can be increased.

Furthermore, in this example, assuming that the free space available in the image memory 19 increases to a value that is more than the predetermined amount again, when the setting for performing recording in page number order is reselected, recording and outputting is carried out such that priority is given to the page number order. However, after carrying out recording and outputting by ignoring the page number order to increase the free space available in the image memory 19, the page number has already been out of order. Therefore, once the free space available in the image memory 19 decreases to an amount that is less than the predetermined amount, control may be carried out such that the setting for recording in page number order continued to be canceled within this one receiving job.

Figure 3:
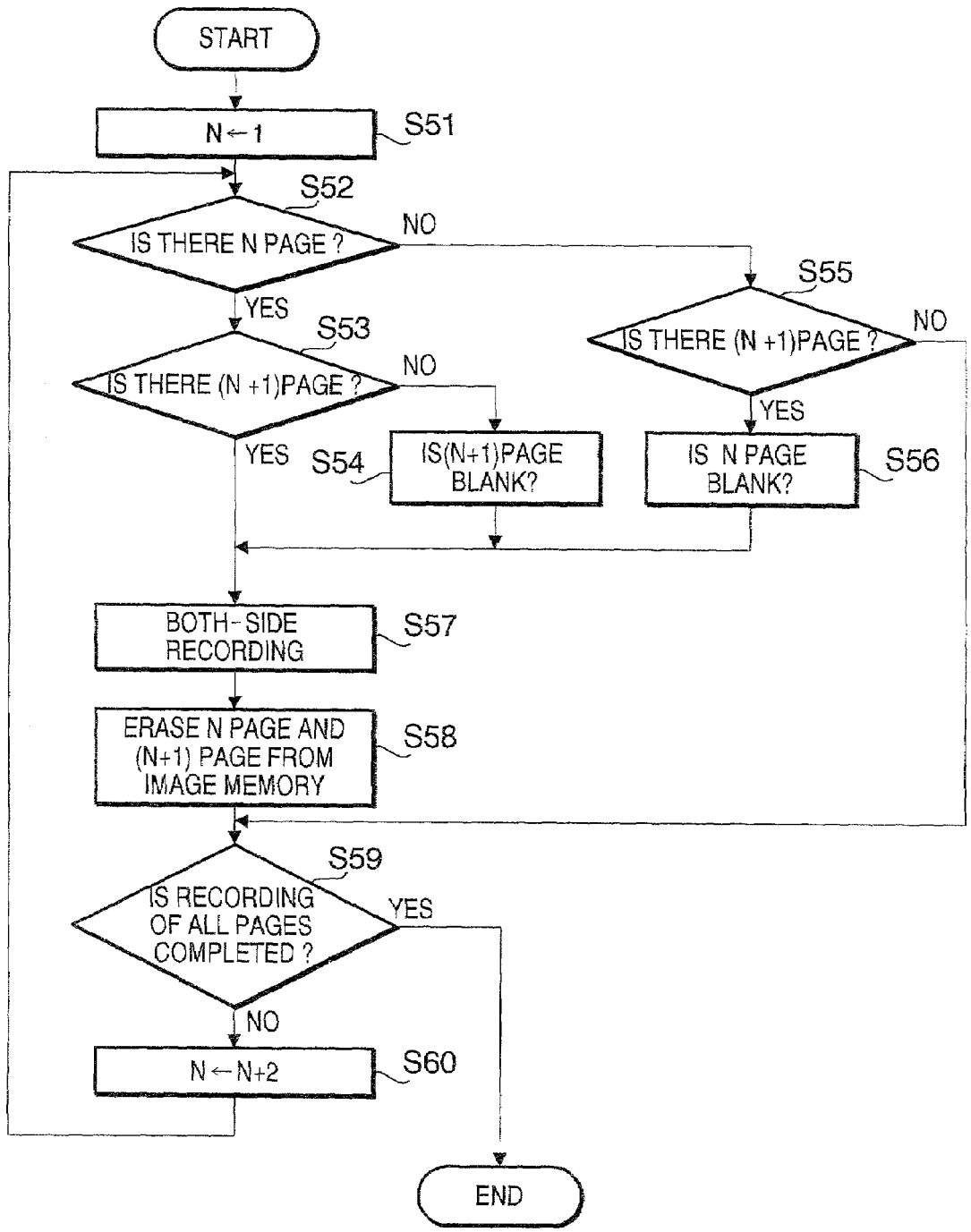
FIG. 3 is a flow chart showing an example of a recording process by a second control mode in the embodiment of the communication terminal device shown in FIG. 1.

Referring to FIG. 3, the second control mode will be described. The second control mode is a control mode in which after the receiving of the images of all pages is completed, the received images are recorded on both sides of a sheet by the recording unit 15. Therefore, all images to be recorded are present within the image memory 19. Further, in the example of the recording process according to the first control mode shown in FIG. 2, after the completion of the receiving, the same recording process as the second control mode is carried out on the images of the remaining pages.

In S51, the variable N indicating the page number is initialized to "1". In S52, it is judged whether or not the image of the page number N is stored in the image memory 19. When the image of the page number N is stored, further in S53, it is judged whether or not the image of the page number (N+1) is stored in the image memory 19. When the images of the page number N and the page number (N+1) are stored in the image memory 19, in S57, the images of these pages are recoded on both sides of a sheet by the recording unit 15. Then, in S58, the recorded images of the page number N and the page number (N+1) are erased from the image memory 19.

Moreover, when the image of the page number N is stored in the image memory 19 but the image of the page number (N+1) is not stored in the image memory 19, the image of the page number (N+1) has not been transmitted. This is the result of the case in which when carrying out both-side transmission, some transmitting apparatuses of the other end do not transmit the image judged to be a blank page by the transmitting side. In this case in which the image of the page number N is present and the image of the page number (N+1) is not present, in S54, the page number (N+1) is judged to be a blank page, and the image of the page number N and the image of the blank page are recorded on both sides of a sheet in S57. Alternatively, only the image of the page number N may be recorded on one side of a sheet. Then, in S58, the image of the page number N is erased from the image memory 19.

When the image of the page number N is not stored in the image memory 19, in S55, it is judged whether or not the image of the page number (N+1) is stored in the image memory 19. When the image of the page number (N+1) is stored in the image memory 19, the page number N is a blank page as in the manner stated above. Accordingly, in S56, the image of the page number N is judged to be a blank page, and the image of the page number N as a blank image and the image of the page number (N+1) are recorded on both sides of a sheet in S57. Then, in S58, the image of the page number (N+1) is erased from the image memory 19.

Furthermore, when both the image of the page number N and the image of the page number (N+1) are not stored in the image memory 19, the process proceeds to S59 without carrying out recording and outputting.

In S59, it is judged whether or not the recording of the images of all pages has been completed. When the images that is yet to be recorded remain, the number "2" is added to the value of the variable N which indicates the page number and the process returns to S52 to repeat the process described above. When the recording and outputting of the images of all pages are completed, this recording process is terminated.

In the operation example described above, an example in which the both-side recording is started from the first page and the second page is shown. Depending on the paper discharging method of the recording unit 15, there are cases in which it is preferable to perform recording from the last page. In such a case, searching of the front page and the back pages and recording of both sides of a sheet can be carried so as to decrease the page number from the maximum page number. Furthermore, for example, the maximum page number can be detected when the receiving of the images of the one side is completed under the continuous mode.

Figure 4:
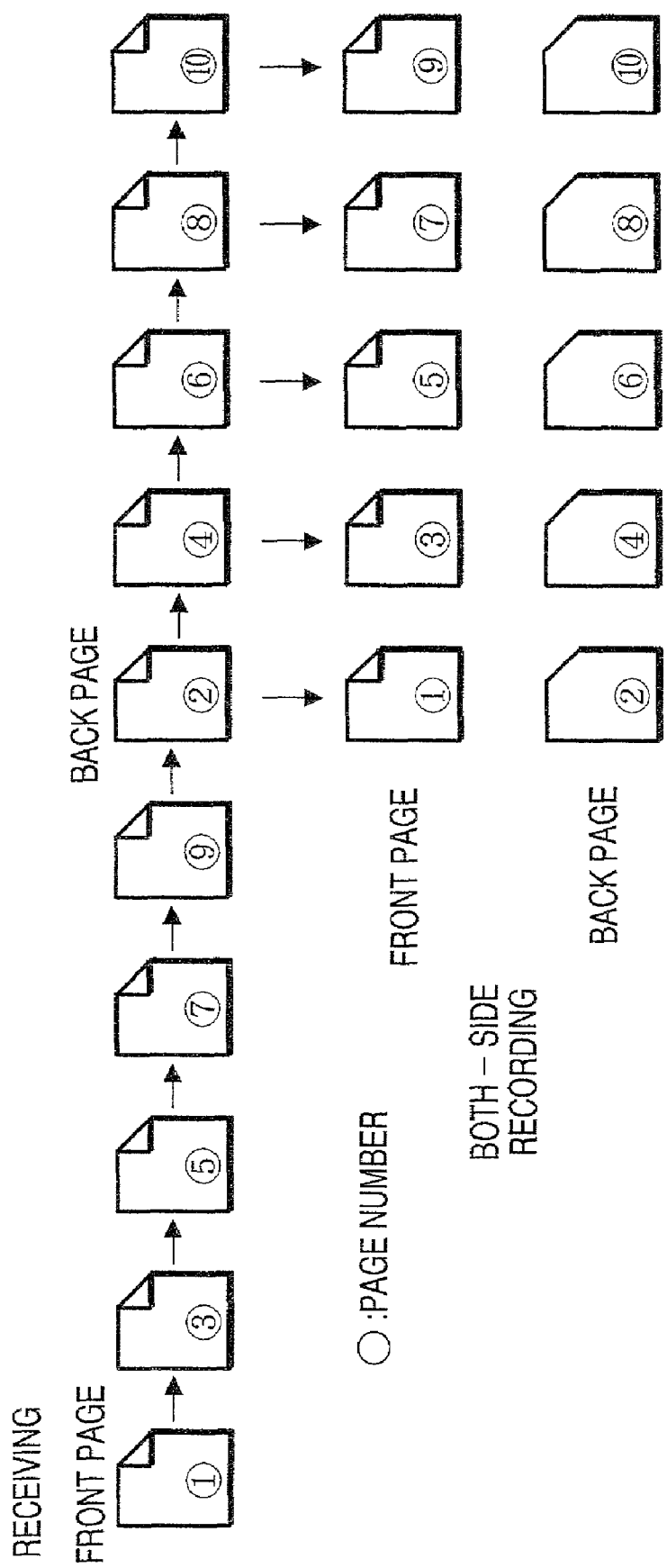
FIG. 4 is an illustration showing an example in which both front pages and back pages are transmitted in ascending order under a continuous mode.

An example of the operation according to the embodiment of the communication terminal device of the present invention will be described by using several specific examples. Referring to FIG. 4, shown is an illustration describing an example in which pages are transmitted such that both of the front page and the back page are arranged in ascending order under the continuous mode. In this example, the images of ten pages are transmitted under the continuous mode. In the continuous mode, for example, the images of the front pages, i.e., the images of the first, third, fifth, seventh, and ninth pages are transmitted continuously. When the recording unit 15 is constructed such that both-side recording is carried out by reversing sheets one by one, both-side recording cannot be carried out while the images of the front pages are being received.

In the first control mode, when the receiving of the images of the front pages is completed and the second page as the image of the back page is transmitted, since the images of the first page and the second page are in the relationship of the front page and the back page, it becomes possible to carry out both-side recording. Therefore, the images of the first page and the second page are recorded on both sides of a sheet by the recording unit 15. Then, the images of the first page and the second page are erased from the image memory 19. In the same manner, when the image of the fourth page is transmitted as the image of the back page, since the images of the third page and the fourth page are in the relationship of the front page and the back page, both-side recording becomes possible. Therefore, the images of the third page and the fourth page are recorded on both sides of a sheet by the recoding unit 15. Then, the images of the third page and the fourth page are erased from the image memory 19. In the same manner, when receiving the image of the sixth page, the images of the fifth page and the sixth page are recorded on both sides of a sheet, and when receiving eighth page, the images of the seventh page and the eighth page are recorded on both sides of a sheet, and when the image of the tenth page is received, the images of the ninth page and the tenth page are recorded on both sides of a sheet.

As in the manner stated above, both-side recording is carried out at the point of time when the images of the front page and the back page are complete, and by erasing the recorded images from the image memory 19, the decrease in the memory capacity is prevented. In this example, comparing to the case in which all of the ten-page images are stored in the image memory 19, only about half of the capacity is required.

Figure 5:
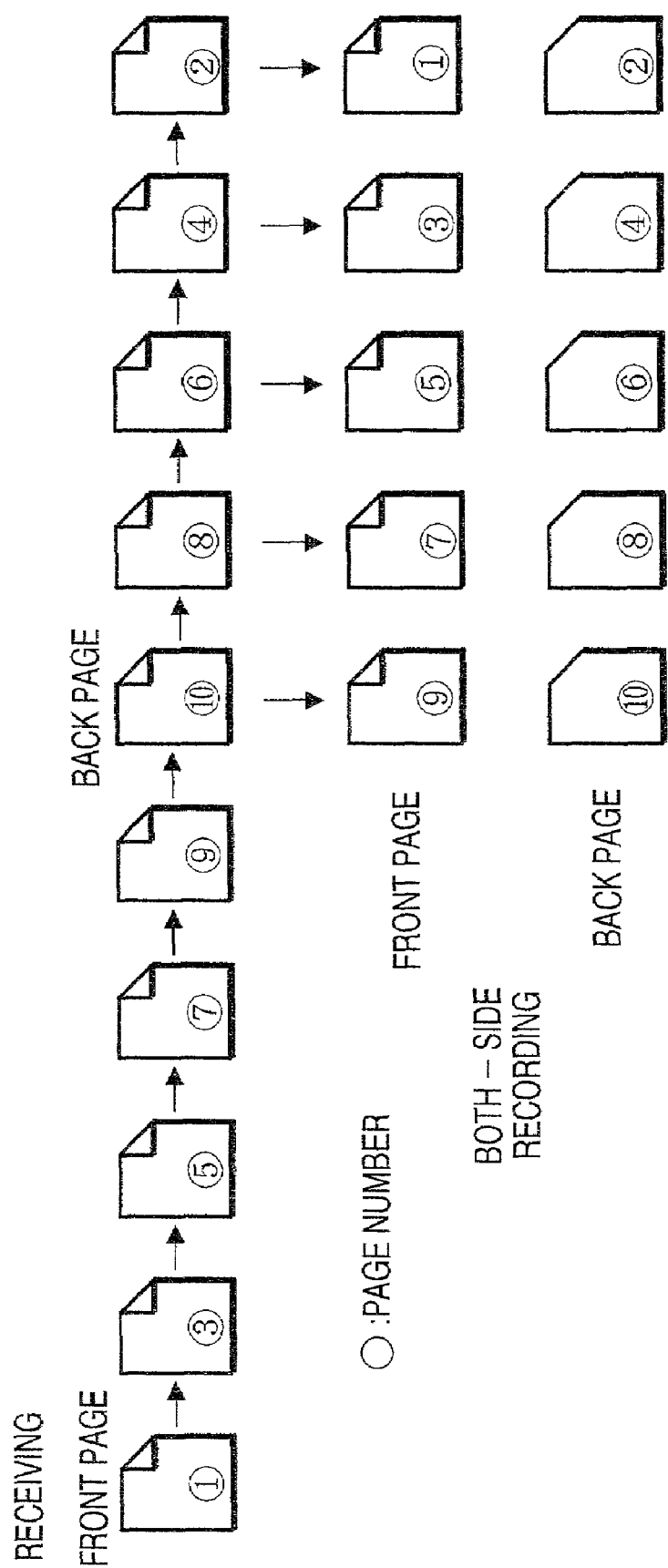
FIG. 5 is an illustration showing an example in which front pages are transmitted in ascending order and back pages are transmitted in descending order under the continuous mode.

Referring to FIG. 5, shown is an illustration describing an example in which the front pages are transmitted in ascending page number order and the back pages are transmitted in descending page number order under the continuous mode. As in the same manner with FIG. 4, the images of ten pages are transmitted under the continuous mode. In this example, for example, after the images of the first, third, fifth, seventh, and ninth pages which are the front pages are transmitted continuously, the images of the back pages are transmitted in the order of tenth, eighth, sixth, fourth, and second pages. Depending on the structure of the reading apparatus of the transmitting side, such a case in which images are transmitted in this page order can be assumed.

In this case, in accordance with the first control mode, when the image of the tenth page is transmitted as the image of the back page, since the images of the ninth page and the tenth page are in the relationship of the front page and the back page, both-side recording becomes possible. Therefore, the images of the ninth page and the tenth page are recorded on both sides of a sheet by the recording unit 15. Then, the images of the ninth page and the tenth page are erased from the image memory 19. In the same manner, when the image of the eighth page is transmitted as the image of the back page, since the image of the seventh page and the eighth page are in the relationship of the front page and the back page, both-side recoding becomes possible. As a result, the image of the seventh page and the eighth page are recorded on both sides of a sheet by the recording unit 15. Then, the images of the seventh page and the eighth page are erased from the image memory 19. In the same manner, when receiving the image of the sixth page, the image of the fifth page and the sixth page are recorded on both sides of a sheet, and when receiving the image of the fourth page, the images of the third page and the fourth page are recoded on both sides of a sheet, and when receiving the image of the second page, the images of the first page and the second page are recorded on both sides of a sheet.

As in the manner stated above, both-side recording is carried out at the point of time when the images of the front page and the back page are complete, and by erasing the recorded images from the image memory 19, the decrease in the memory capacity can be prevented. In this example, comparing to the case in which all of the ten-page images are stored in the image memory 19, only about half of the capacity is necessary. Furthermore, when it is required to carry out recording and outputting from the first page due to a paper discharging mechanism of the recording unit 15 in order to maintain page order, and the setting for performing recording in page number order is selected, both-side recording is started after waiting until the image of the second page is received.

Figure 6:
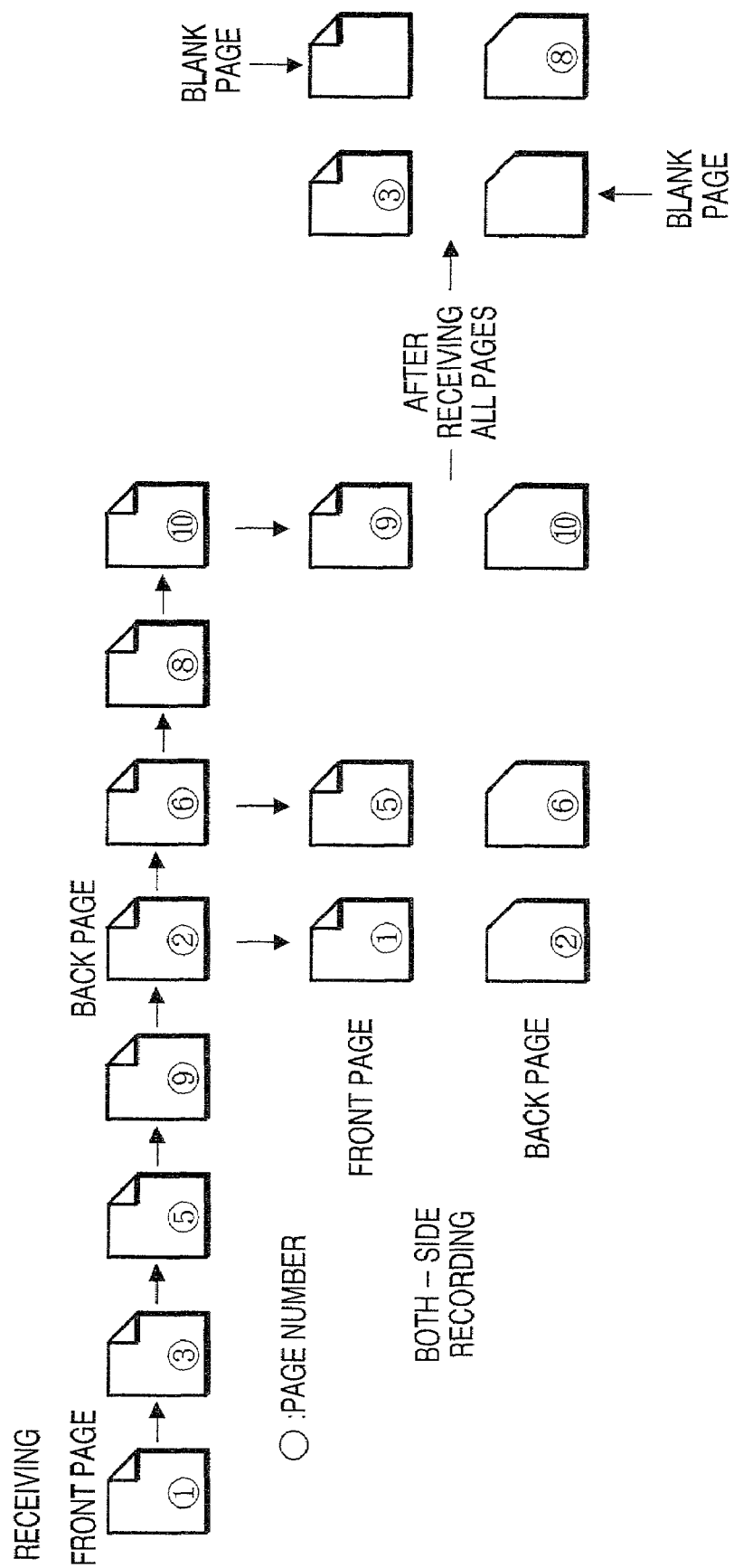
FIG. 6 is an illustration showing an example in which both front pages and back pages are transmitted in ascending order under the continuous mode and skip pages exist.

Referring to FIG. 6, shown is an illustration describing an example in which both the front page and the back page are transmitted in ascending page order, and there are skip pages. In this example, both-side images of ten pages are transmitted in the same manner as FIG. 4, but the fourth page and the seventh page are blank pages and not transmitted. As shown in FIG. 6, the images of the first, third, fifth, and ninth pages are transmitted as the images of the front pages, and the images of the second, sixth, eighth, and tenth pages are transmitted as the images of the back pages, in this order. The fourth page and the seventh page are skip pages whose images are not transmitted.

In accordance with the first control mode, when the image of the second page is transmitted as the image of the back page, as in the manner stated above, the images of the first page and the second page are recorded on both sides of a sheet by the recording unit 15. Then, the images of the first page and the second page are erased from the image memory 19. Next, the sixth page is transmitted as the image of the back page. When recording of both sides is carried out by ignoring the page number order, or when the free space available in the image memory 19 does not meet the predetermined amount, since the images of the fifth and the sixth pages are in the relationship of the front page and the back page, the images of the fifth page and the sixth page are recorded on both sides of a sheet by the recording unit 15, and the recorded images of the fifth page and the sixth page are erased from the image memory 19.

The eighth page is further transmitted as the image of the back page. However, since the image of the corresponding seventh page is not stored in the image memory 19, the recording and outputting is not carried out at this time. When the image of the tenth page is transmitted, since the images of the ninth page and the tenth page are in the relationship of the front page and the back page, the images of the ninth page and the tenth page are recorded on both sides of a sheet by the recording unit 15, and the recorded images of the ninth page and the tenth page are erased from the image memory 19.

In this manner, first and second pages, fifth and sixth pages, and ninth and tenth pages are recorded on both sides of a sheet, and the images of the third page and the eighth page remain stored in the image memory 19. In accordance with the process after the completion of the receiving shown in FIG. 3, the fourth page is judged to be a skip page, and the images of the third page and the blank page are recorded on both sides of a sheet. In the same manner, the seventh page is judged to be a skip page, and both-side recording is carried out with the images of a blank page and the eighth page.

Moreover, when the recording and outputting is carried out as in the manner stated above, the page order of the paper discharged to the discharging unit of the recording unit 15 is shuffled, and the user is required to rearrange the pages. To prevent this, the setting for recording in page number order can be carried out. When the setting for recording in page number order is selected, it is attempted to record the third page and the fourth page, however, since the image of the fourth page is not transmitted, during the communication, recording is stopped under the state in which the images of the first page and the second page have been recorded on both sides of a sheet. After the receiving of all pages is completed, according to the process shown in FIG. 3, the third page and the blank image, the fifth page and the sixth page, the black image and the eighth page, and the ninth page and the tenth page are recorded on both sides of sheets, respectively.

Referring to FIGS. 7A, 7B, and 7C, shown is an illustration describing an example in which a document of a different size exists between pages. FIG. 7A shows a case in which out of four sheets of both-sided documents, the document of the third sheet (the fifth page and the sixth page) has a different size. When transmitting the images of such documents in the original order under the continuous mode, it is necessary to return the communication protocol to a predetermined phase (phase B) for changing an image size after transmitting the images of the first page and the third page, and to transmit the fifth page by restarting the communication after carrying out negotiation or training. Furthermore, since the document size of the seventh page differs from that of the fifth page, after transmitting the image of the fifth page, it is required to carry out the communication procedure for changing the document size again. In addition, concerning the images of the back pages, after transmitting the images of the second page and the fourth page, it is required to carry out the communication procedure in the same manner. Also after transmitting the image of the sixth page, it is required to carry the same communication procedure. Such a communication procedure for changing the image size requires more time, and as a result, the communication costs become expensive.

To suppress the increase in such communication costs, for example, the process as shown in FIG. 7B in which the images of the documents having the same size are transmitted together can be applied. In this example, since the images of the first page through the fourth page, the seventh page and the eighth page have the same size, these pages are transmitted together under the continuous mode. In other words, the images of the first, third and seventh pages are transmitted as the images of the front pages, and the images of the second, fourth, and eighth pages are transmitted subsequently. Then, a communication procedure for changing the image size is carried out, and the image of the fifth page is transmitted as the image of the front page, and the image of the sixth page is transmitted as the image of the back page. Transmitting under such a procedure requires the only one action of the communication procedure for changing the image size, thus resulting in the shortening of the communication time and suppressing the communication expenses.

When the images are transmitted in such page order, according to the first control mode, the images of the first page and the second page are recorded on both sides of a sheet after receiving the images of the second page of the back page, and these images are erased from the image memory 19. Moreover, the images of the third page and the fourth page are recorded on both sides of a sheet after receiving the image of the fourth page, and these images are erased from the image memory 19. Furthermore, when the setting for performing recording in the page number order has not been selected, the images of the seventh page and the eighth page are recorded on both sides of a sheet after receiving the image of the eighth page, and then these images are erased from the image memory 19. In addition, the images of the fifth page and the sixth page are received, and the size of the paper for recording the image is changed, and both-side recording is carried out.

As in the manner stated above, even in the case in which the page order is changed, both-side recording is carried out when the pages of the front page and the back page are complete, and then the images of the recorded pages are erased from the image memory 19. Therefore, the images which have been received by both-side receiving can be recorded and output with a small amount of a memory. Moreover, in the case of using the image memory in other processes, the occurrence of troubles in other processes due to the decrease in the free space in the memory can be suppressed. Furthermore, for example, as shown in FIG. 7B, also at the transmitting side, the communication time can be saved by changing the transmitting page order, and the communication expense can be suppressed.

Further, FIG. 7C shows the page order when transmitting under the alternate mode in the page order shown in FIG. 7A. In this case, the pages are rearranged so that the pages of the same size are transmitted together. In this example, after transmitting the first, second, third, and fourth pages, the seventh and eighth pages are transmitted. Then, after carrying out the communication procedure for changing the image size, the images of the fifth and the sixth pages are transmitted.

According to the alternate mode, the image of the front page and the image of the back page are transmitted alternately. Therefore, when receiving the first and second pages, these are recorded on both sides of a sheet, and then erased from the image memory 19. When receiving the third and fourth pages, these are recorded on both sides of a sheet, and then erased from the image memory 19. Then, the fifth page is not transmitted, but when the setting for performing recording in page order has not been selected, or when the free space available in the image memory 19 does not satisfy the predetermined amount, after receiving the seventh and eighth pages, these are recorded on both sides of a sheet, and deleted from the image memory 19. As a result, the capacity of the image memory 19 can be used efficiently. Finally, the fifth and sixth pages whose sizes are different from other pages are received, and then recorded on both sides of a sheet.

As in the manner stated above, even in the case of using the alternate mode, by erasing the images from the image memory 19 after both-side recording when the front page and back pages are complete, the image memory 19 can be used efficiently. As a result, even when the memory volume is small, or when the image memory 19 is used for other processes, both-side recording can be carried out without a problem.

In the example shown in FIGS. 7A, 7B, and 7C, the case in which the documents of differing sizes exist between the 5 pages was described. However, the process can be carried out in the same manner for a case in which various conditions are intervening where the communication mode is different, or the documents having different resolution exist between the pages, or the black-and-white documents and the color documents are mixed. In other words, in the transmitting side, the pages are rearranged such that the pages which can be transmitted under the same communication mode are arranged together, and then transmitted. Even when receiving the images of such page order, the images are recorded on both sides of a sheet from the images of the pages whose front page and back page are complete, and then the recorded images are erased from the image memory 19. Therefore, comparing to the second control mode in which the recording process is carried out after receiving all images, the data volume to be stored in the image memory 19 can be decreased, and the image memory 19 can be utilized efficiently.

As it is apparent from the above description, according to the present invention, the first control mode for carrying out both-side recording when the images of two pages which are in the relationship of the front page and the back page are complete is provided. Since the images recorded by the first control mode can be erased from the image memory, comparing to the case in which the recording and outputting is started after storing all received images into the image memory, the amount occupying the image memory can be decreased considerably. Therefore, the image memory can be utilized efficiently, and both-side receiving can be carried out even when the capacity of the image memory is small. In addition, even when using the image memory in other processes, the memory volume that can be used in other processes can be increased, and the occurrence of troubles in other processes can be suppressed. Moreover, by constructing such that the setting for performing the recording and outputting in the page order can be selected, it is possible to prevent outputting in shuffled page order, and to save a user time for rearranging the pages afterward.

Furthermore, by providing the second control mode for recording and outputting after storing the images of all pages into the image memory, and by constructing such that switching between the first control mode and the second control mode can be carried out in accordance with a demand of the user or the free space available in the image memory, it is possible to provide an advantage that a desirable control mode can be used selectively.

What is claimed is:

1. A communication terminal device with both-side receiving function comprising:
    a receiving means for receiving an image wherein said receiving means is capable both of first receiving images of front pages and then receiving images of back pages and receiving images of front pages and back pages alternately;
    a recording unit capable of carrying out both-side recording;
    an image memory for storing an image; and
    a control unit for performing control by a first control mode in which a received image is stored in the image memory, and, regardless of the receiving order, when images of two pages that are in relationship of a front page and a back page are stored in the image memory, the images of the two pages are recorded on both sides of a sheet by the recording unit and are erased from the image memory, and a second control mode in which both-side recording is started after receiving of images of all pages has been completed,
    wherein the control unit performs control such that when free space in the image memory is more than a predetermined amount, the control unit selects the second control mode, and when the free space in the image memory is not more than the predetermined amount, the control unit selects the first control mode.

2. The communication terminal device according to claim 1 wherein the control unit controls recording and outputting order, and when images of two pages that should be recorded next time in accordance with the recording and outputting order are stored in the image memory, the control unit makes the recording unit record the images of two pages that should be recorded next time on both sides of a sheet.

3. The communication terminal device according to claim 1 wherein in the second control mode, when a page corresponding to one of images to be recorded on both sides of a sheet does not exist, the other of the images is recorded on one side of the sheet without recording the one of the images.

4. The communication terminal device according to claim 1 wherein in the second control mode, when a page corresponding to one of images to be recorded on both sides of a sheet does not exist, the other of the images is recorded on one side of the sheet without recording the one of the images.

5. The communication terminal device according to claim 1 wherein in the second control mode, when a page corresponding to one of images to be recorded on both sides of a sheet does not exist, a blank image is recorded on one side of the sheet, said one side having no corresponding page.

6. The communication terminal device according to claim 1 wherein in the second control mode, when a page corresponding to one of images to be recorded on both sides of a sheet does not exist, a blank image is recorded on one side of the sheet, said one side having no corresponding page.

7. The communication terminal device according to claim 1, wherein when images that includes images of a different size document are transmitted to the communication terminal device, the receiving means receives images of a same size document together.

8. The communication terminal device according to claim 1, wherein the recording unit carries out both-side recording sheet by sheet such that after the recording unit records one of the images of the two pages that are in relationship of the front page and the back page on one side of the sheet, the recording unit reverses the sheet, and then records the other of the images of the two pages on the other side of the sheet.

9. A method of performing both-side recording, comprising the steps of:
    (A) receiving an image;
    (B) storing the image in an image memory;
    (C) carrying out both-side recording under a first control mode in which when images of two pages that are in relationship of a front page and a back page are stored in the image memory, regardless of whether the images are received in the order of front pages and then back pages or alternating front page then back page, the images of the two pages are recorded on both sides of a sheet, and are erased from the image memory, and under a second control made in which after images of all pages have been received and stored in the image memory, the both-side recording is started.

wherein when free space in the image memory is more than a predetermined amount, the both-side recording is carried out under the second control mode, and when the free space in the image memory is not more than the predetermined amount, the both-side recording is carried out under the first control mode.

10. The method according to claim 9, wherein in the step (C), the recording is carried out in page number order such that when images of two pages to be recorded next time in accordance with the page number order are stored in the image memory, the images of the two pages to be recorded next time are recorded on both sides of a sheet.

11. The method according to claim 9, wherein under the second control mode, when one of images of two pages that are in relationship of a front page and a back page does not exist, a blank image and the other of the images of the two pages are recorded on both sides of a sheet.

* * * * *